United States Patent [19]

Khutoretsky et al.

[11] 4,238,339

[45] Dec. 9, 1980

[54] ARRANGEMENT FOR SUPPORTING STATOR END WINDINGS OF AN ELECTRIC MACHINE

[76] Inventors: Garri M. Khutoretsky, Altaiskaya ulitsa, 20, kv. 5; Vladimir M. Fridman, Grazhdansky prospekt, 13, korpus 1, kv. 170, both of Leningrad; Alexandr I. Vorontsov, ulitsa Khazova, 43, kv. 94, Pushkin Leningradskoi oblasti; Igor A. Prigorovsky, ulitsa Basseinaya, 53, kv. 4; Anatoly D. Ignatiev, ulitsa Basseinaya, 85, kv. 162, both of Leningrad, all of U.S.S.R.

[21] Appl. No.: 963,671

[22] Filed: Nov. 27, 1978

[51] Int. Cl.³ .............................................. H02K 3/46
[52] U.S. Cl. ...................................... 310/260; 310/51
[58] Field of Search ................ 310/260, 271, 51, 194, 310/270; 336/197

[56] References Cited

U.S. PATENT DOCUMENTS

| | | | |
|---|---|---|---|
| 3,089,048 | 5/1963 | Bahn | 310/260 |
| 3,344,296 | 9/1967 | Coggeshall | 310/260 |
| 3,344,297 | 9/1967 | Bishop | 310/260 |
| 3,691,416 | 9/1972 | Drexler | 310/270 |
| 4,088,913 | 5/1978 | Prigorovsky | 310/260 |
| 4,126,799 | 11/1978 | Iogansen | 310/260 |

FOREIGN PATENT DOCUMENTS 1366320 7/1964 France ..................................... 310/260

*Primary Examiner*—R. Skudy
*Attorney, Agent, or Firm*—Lackenbach, Lilling & Siegel

[57] ABSTRACT

The disclosed arrangement for supporting stator end windings of an electric machine comprises a rigid inner ring and an outer ring, said rings being made of electrically insulating material. The inner ring is mounted coaxially with the inner bore of the stator core and supports the end portions of a stator bar winding, and the outer ring externally embraces these end portions. Both rings are mounted and secured together along the head portions of the end windings. The inner ring is attached to Z-shaped members arranged adjacent to the end portions and preventing the inner ring from axial displacement relative to the end portions. This is achieved due to the fact that a projection of each Z-shaped member, facing the end surface of the core, is positioned between winding bars at their outlet from core slots, said projection being rigidly connected with one of the brackets movably associated with a clamping plate of the core and attached to the outer ring. Thus, the proposed arrangement for supporting end windings, combined with the end windings supported thereby, makes up a rigid integral unit resistive to the action of vibrations arising during operation of an electric machine.

6 Claims, 1 Drawing Figure

U.S. Patent Dec. 9, 1980 4,238,339
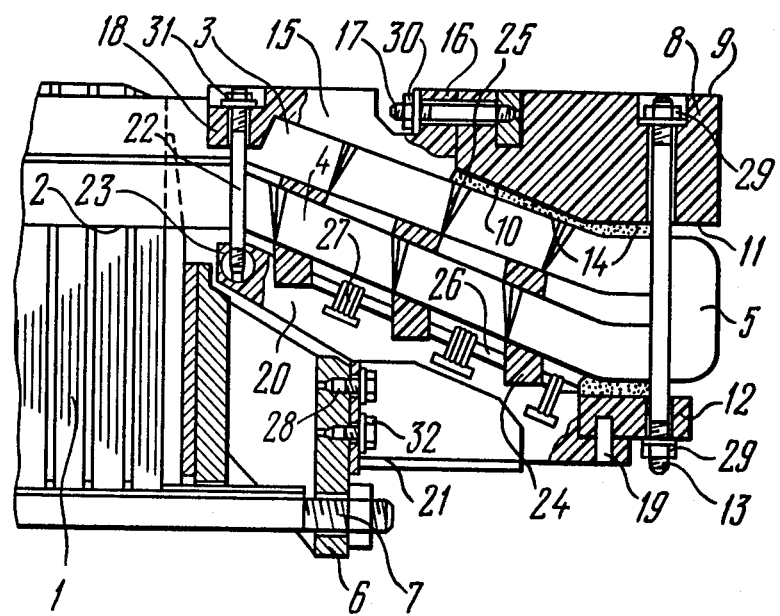

ARRANGEMENT FOR SUPPORTING STATOR END WINDINGS OF AN ELECTRIC MACHINE

FIELD OF THE INVENTION

The present invention relates to electric machines and, more particularly, to arrangements for supporting stator end windings of an electric machine.

The present invention can most advantageously be used in powerful and superpowerful turbogenerators wherein stator electric windings experience considerable electrodynamic loads and thermal effects during machine operation.

BACKGROUND OF THE INVENTION

There is known an arrangement for supporting stator end windings of an electric machine (cf. Swiss Pat. No. 413,073), comprising an inner ring mounted coaxially with the bore of the stator core and supporting stator end windings, and an outer ring externally embracing stator end windings, both rings being made of electrically insulating material. In said arrangement the inner and outer supporting rings are interconnected by means of the end windings and fastening members attaching them to the end windings. Therewith the outer ring may be axially displaced relative to the stator core and is tightly connected with a stator frame in a radial direction.

Among the disadvantages of this arrangement is the relatively large number of fastening members having a comparatively complex configuration which requires an increased precision of manufacturing tolerances and complicates the assembling and adjustment of the electric machine stator winding.

Another disadvantage of this arrangement is an insufficient decrease in the level of the end winding vibrations which appear under the influence of variable electrodynamic loads during operation of an electric machine and which may result in the failure of solderings of winding bar connections, in wear and crumpling of insulation at the points of attachment and at the outlet of bars from the core slots, and in fatigue damage to elementary copper conductors of winding bars. This disadvantage results for the following reasons. Firstly, the inner and outer supporting rings are mounted at a relatively large distance from the end winding heads wherein, during operation of an electric machine, the end windings, as a rule, have a maximum level of vibrations. Secondly, the inner ring has a small cross sectional area compared to the cross-sectional area of the end windings and, consequently, it cannot increase the total rigidity of the entire end winding supporting arrangement as required. However, it is common knowledge that a high rigidity of a supporting arrangement is one of the main factors in reducing the end winding vibration level. Thirdly, the inclusion of a number of intermediate fastening members for securing the inner and outer rings to the end winding bars also decreases the rigidity of connection of these rings with the end windings and, accordingly, fails to provide a reduced level of vibrations.

Among the other disadvantages of the known construction for supporting end windings is the fact that the outer ring, on the one hand, is tightly connected in a radial direction with the stator frame by means of fastening members and, on the other hand, is rigidly connected with the stator winding. As a result, during operation of an electric machine end winding vibrations are superimposed by stator frame vibrations, which may cause additional variable bending strains of the winding bars in the zone where these bars pass from a slot winding portion to an end portion and that will adversely affect the strength of the bars and decrease the end widing support reliability.

Thus, the known arrangement for supporting stator end windings of an electric machine fails to provide sufficiently reliable support of end windings and, hence, does not eliminate the danger of the end winding resonance of a forcing vibration frequency which may occur during operation of an electric machine.

SUMMARY OF THE INVENTION

It is an object of the present invention to provide a reliable arrangement for supporting stator end windings of an electric machine to insure a high rigidity of end winding support, and a substantial decrease of end winding vibration level when the end windings are affected by high electrodynamic forces, while permitting axial displacement of the end windings to compensate for stator winding thermal expansion during operation of an electric machine.

Another object of the invention is to provide an arrangement for supporting stator end windings of an electric machine so as to insure a possibility of a resonance frequency shift of natural vibrations of the arrangement beyond the operating range of forcing vibration frequencies, which develop during operation of an electric machine.

A further object of the present invention is to increase the operational reliability of an electric machine in whole.

With these and other objects in view, there is proposed an arrangement for supporting stator end windings of an electric machine, comprising an inner ring and an outer ring secured to each other and made of electroinsulating material. The inner ring is mounted coaxially with the bore of a stator core and supporting stator end windings, and the outer ring externally embraces the end windings and is movably connected with the stator core. According to the invention, the inner ring is secured to the outer ring substantially along a portion of the end windings heads and attached to Z-shaped members adjoining the end winding and preventing the inner ring from axial displacements relative to the end windings by means of projections. The projection of each Z-shaped member, facing an end surface of the core, is positioned between winding bars at the outlet of said bars from core slots and rigidly connected with one of the brackets movably connected with a core clamping plate and secured to the outer ring.

The advantage of the proposed arrangement for supporting stator end windings of an electric machine is that the inner and outer supporting rings are mounted essentially along the portion of the end windings heads, i.e. in the zone of maximum level of end winding vibrations, thereby considerably decreasing the level of end winding vibrations which appear under the influence of electrodynamic loads during operation of an electric machine. Moreover, in the construction of the proposed arrangement slot and end portions of stator winding bars are movably secured relative to the stator core and not connected with the stator frame, thus permitting displacement of end windings during their thermal expansion and considerably decreasing the probability of their exposure to stator frame vibrations.

It is advisable that the inner ring be attached to the outer ring by means of pins and gaskets made from moulding and hardening material, disposed between these rings and the stator end windings.

It is also advisable that the projection of the Z-shaped member, facing the stator core end, should be secured to the bracket by pins, the bracket being attached to the outer ring.

Such a connection of said elements of the arrangement provides for ease of assembly and insures a reliable operation of the proposed arrangement for supporting end windings.

Moreover the pins should be made of nonmagnetic material.

The pins can be made of nonmagnetic steel with an electrically insulating coating.

The pins can also be made of fiberglass material.

The use of these materials prevents the induction of eddy currents in the pins and their subsequent heating due to these currents.

BRIEF DESCRIPTION OF THE DRAWING

These and other objects and advantages of the present invention will become more apparent upon consideration of the following detailed description of one embodiment taken in conjunction with the accompanying drawing which illustrates a longitudinal sectional view of a part of the stator of an electric machine with an arrangement for supporting stator end windings, according to the invention.

It is to be understood that the accompanying drawing is merely an illustration of the embodiment of the present invention, and that various changes in the shape, size and arrangement of parts may be resorted to, without departing from the invention.

DETAILED DESCRIPTION OF THE INVENTION

Referring now to the drawing it will be seen that in a stator core of an electric machine, specifically, the the core 1 of a powerful turbogenerator, made up of magnetoconductive stacks, there are slots, such as the slot 2, wherein the stator winding is laid, said winding having end portions of a upper 3 and a lower 4 (according to the drawing) winding bars the connection of which forms a head 5. On both end surfaces of the core 1 there are elements mounted to provide clamping of the magnetoconductive stacks in an axial direction and comprising, at the end shown in the drawing, a clamping plate 6 and a coupling pin 7.

The arrangement for supporting stator end windings, according to the invention, comprises an inner ring 8 having a large cross-sectional area, made of electrically insulating material, and having a sufficiently high value of stiffness dictated by considerations given hereinbelow. The inner ring 8 is mounted coaxially with the bore of the core 1 and at a distance from the end surface of the core that distance being determined by the length of the end windings; it has a cylindrical inner surface 9, which has a diameter substantially equal to that of the bore of the core 1, and an outer surface comprising a conical portion 10 and a cylindrical portion 11. The end windings are supported by the inner ring 8 in such a way that an inclined part of the end portion of the upper bar 3 is adjacent to the conical part 10, and the head 5 is adjacent to the cylindrical part 11 of the outer surface of that ring.

Externally to the stator end windings and embracing them there is mounted an outer ring 12 having a small cross-section area, as compared to the cross-sectional area of the inner ring 8. The outer ring 12 adjoins with its inner surface the head 5, pressing the end portions against the inner ring 8. The outer ring 12 and the inner ring 8 are attached together by means of coupling the pins 13. To attain tight connection of the rings 8 and 12 with the end windings, between the end portion and the head 5 of the upper bar 3 and the outer surfaces 10 and, 11 of the inner ring 8, facing said end portion, and, between the head 5 of the end portion of the lower bar 4 and an inner surface of the outer ring 12, facing said end portion, there is disposed a gasket 14 made from moulding and hardening material possessing adhesive properties. Said material provides reliable sealing of assembling clearance between end portions and the inner ring 8 and the outer ring 12, completely fills the inherent non-uniformity of that clearance, and increases the rigidity of attachment of these rings to the end windings.

The inner ring 8 is secured to axially positioned Z-shaped members which prevent that ring from axial displacements relative to the end portions, of which members is shown in the drawing a Z-shaped member 15. A projection 16 of the Z-shaped member 15 is secured to the inner ring 8 by means of a pin 17, and a projection 18 of that member is positioned between upper bars 3 of the stator winding at their outlet from the slot 2 of the core 1. The projection 18 of the member 15 has a configuration corresponding to the configuration of the portions of the upper bars 3, to which it is adjacent.

The outer ring 12 by means of a stud 19 is secured to a bracket 20 made of electrically insulating material and movably connected with a chute-shaped yoke 21 accommodating that bracket and made of nonmagnetic steel, said yoke being attached to the clamping plate 6 thus providing the possibility of axial displacement of the end windings along with the inner 8 and outer 12 rings relative to the stator core 1. The Z-shaped member 15 is rigidly connected with the bracket 20 due to the fact that the projection 18 of that member is secured by means of a pin 22 to an end 23 of the bracket 20, located underneath that projection.

The end portions of the upper and lower bars 3 and 4 of the stator winding are laid onto bandage rings 24 supported by the bracket 20 and joined together by means of cord bindings 25. Between the bandage rings 24 are positioned separating spacers 26 which, in turn, are secured to the bracket 20 by means of cords 27 disposed in the openings formed in that bracket. The chute-shaped yoke 21 is rigidly fixed to the clamping plate 6 by means of pins 28. Each of the pins 13, 17, 22 and 28 is provided with nuts 29, 30, 31 and 32, respectively.

The operation of the proposed arrangement for supporting stator end windings of an electric machine is as follows.

During operation of a turbogenerator, the stator end windings are exposed, as mentioned hereinabove, to variable electrodynamic loads tending to cause end winding vibrations primarily in radial and tangential directions. However, in the proposed arrangement for supporting end windings the level of vibrations is considerably decreased due to the sufficient rigidity of the construction, primarily determined by a rigid connection of the elements included into the arrangement. Therewith is formed a closed chain of rigidly secured elements, comprising: inner ring 8, Z-shaped member 15 with the projection 18, coupling pin 22, electroinsulating bracket 20, outer ring 12, coupling pins 13 with the gaskets 14 made from moulding and hardening material, laid over the head 5 of the end windings, and the inner ring 8. That chain provides the integrity of the end windings and their supporting elements, which exhibit resistance to forces acting upon them, as a single unit.

An appreciable contribution to the rigidity of the entire construction of the proposed arrangement is the rigidity of the inner ring 8 the operation of which is based on the following. The arrangement of end windings with the simplest supporting elements (bandage rings, cord bindings etc), being joined as a single unit, has its inherent specified rigidity C, reduced mass M, and a natural vibration frequency expressed by $$\omega_c = \sqrt{\frac{C}{M}} \qquad (1)$$

Under the influence of variable electrodynamic forces the magnitude of vibration A of such a system will be determined by the amount of the disturbing force F, the value of rigidity C, the degree of tuning out from the forcing oscillation frequency $\Gamma$, and a damping factor $\omega$, according to the following expression $$A = \frac{F}{C\sqrt{\left[1 - \left(\frac{\omega}{\omega_c}\right)^2\right]^2 + \gamma^2}} \qquad (2)$$

As it was found, the natural rigidity C of the stator end windings cannot be increased over a certain value defined by the geometric dimensions of the end windings and the physical properties of the materials used for their support. Along with that, the magnitude of the frequency of the end winding natural vibrations in many cases approximates the frequency $\Gamma$ of forcing vibrations (100 or 120 Hz). In that case the magnitude of the vibration A increases along with the increase of the disturbing force F. To ensure a considerable decrease of the magnitude of the vibration A, the inner ring 8 should have a natural rigidity $C_1$ greater than the rigidity C of the end windings without that ring. Therewith the decrease of the magnitude of the vibration A is due to the increase of the total rigidity, determined by C and $C_1$ as well as due to the change in the value of the natural oscillation frequency of the entire system caused by the change of its total rigidity.

The increase of rigidity of the inner ring 8 in the arrangement for supporting end windings, according to the invention, is achieved by the choice of a material for the manufacture of the inner ring 8 with a rather high modulus of elasticity, and due to the cross-sectional area of that ring being commensurable with the cross sectional area of the end windings. The last mentioned measure is obtained, in turn, by means of a suitable choice of a minimum inner diameter of the inner ring 8, possible for the given type of a turbogenerator, and by the choice of the optimum thickness of that ring owing to its mounting preferably at the portion of the heads 5 of end windings.

More precisely, the geometrical dimensions of the inner ring 8 of the proposed arrangement of end windings, used in the stator of a two pole turbogenerator, are chosen from the following considerations. To obtain the required rigidity properly correlated to the total rigidity of the entire supporting system that ring should have its main frequency of natural bending oscillations exceeding the frequency of the action of the disturbing force in no less than 25 percent. As, for example, in a turbogenerator with an operating frequency of 50 Hz and with a forcing vibration frequency of 100 Hz, the frequency $f_1$ of natural vibrations of the inner ring 8 is determined by the relationship $$f_1 \geq 125 = K \frac{h_2}{R_m} \text{ Hz}, \qquad (3)$$

where
h is the ring thickness,
$R_m$ is the average radius of the ring, and
$K \approx 4.7 \cdot 10^4$ cm/sec is the coefficient that primarily depends upon the shape and material of the ring, and is chosen to meet the condition that the modulus of elasticity is $E = 2.8 \cdot 10^5$ kg/cm$^2$.

Thus, the mounting of the inner ring 8, having an enlarged cross section area and, consequently, an increased mass, along the heads 5 of the end windings, also changes the natural vibration frequency of the entire arrangement for supporting end windings, which causes a consequent decrease of the magnitude of the vibration A. That provides the possibility of suitable variation of the natural oscillation frequency of the end winding supporting system, and, consequently, of the system vibration level, by means of changing the location of the inner ring 8 on end windings or by predetermining the value of the cross section area.

During variation of the length of the slot winding portion due to its temperature changes, end windings combined with the inner ring 8 and the outer ring 12 will be freely displaced in an axial direction relative to the stator core 1 due to the fact that the bracket 20, secured to the outer ring 12 and rigidly connected with the inner ring 8 by means of the Z-shaped member 15, has the possibility of displacement in the chute-shaped yoke 21 attached to the clamping plate 6 of the core 1, said yoke being stationary in that case. Similarly, during the thermal explansion of the stator core 1, the movement of the clamping plate 6 will not influence the position of the end windings, since the chute-shaped yoke 21 is freely displaced relative to the bracket 20 which is stationary in that case.

In the proposed arrangement for supporting the stator end windings the inner ring 8, the outer ring 12, the Z-shaped members 15, and the brackets 20 are made of electrically insulating material, such as fiberglass material based on epoxy resins, and the coupling pins 13 and 22 are made of nonmagnetic material, such as nonmagnetic steel with an electrically insulating coating or fiberglass material mentioned above.

The proposed arrangement for supporting stator end windings of an electric machine provides:
-for a choice of the required rigidity of the inner ring,
-for alteration of the natural vibration frequency relative to a forcing vibration frequency, and
-for an increase of the end winding support reliability due to a considerable decrease of the level of maximum vibrations appearing during operation of an electric machine, by means of mounting a rigid inner ring into the zone of the end winding heads.

The elements comprising the arrangement are easy to fabricate and its construction is convenient in assembling and in the maintenance of an electric machine.

It is to be understood that the present invention is not limited by the embodiment herein described and illustrated and that numerous modifications and other embodiments of the porposed means for supporting stator end windings of an electric machine may be devised without departing from the true spirit and scope of the invention defined by the following claims.

What is claimed is:

1. In a stator of an electric machine including a core having slots arranged around the periphery thereof and provided with an inner bore, clamping plates secured to the end surfaces of said core, and a bar winding laid into said slots of said core and having end portions with heads, an arrangement for supporting said end portions of said winding, comprising:

an inner ring made of an electrically insulating material, mounted coaxially with said inner bore of said core, and supporting said end portions;

an outer ring made of an electrically insulating material and externally embracing said end portions, said inner ring being secured to said outer ring substantially along said heads of said end portions;

a plurality of Z-shaped members secured to said inner ring and adjoining said end portions, a projection of each of said Z-shaped members, facing an end surface of said core, being positioned between said bars of said winding at the outlet of said bars from said core slots and preventing said inner ring from axial displacements relative to said end portions; and a plurality of brackets, each bracket being movably connected to said clamping plates and having one end attached to said outer ring and a second end attached to said projection of one of said Z-shaped members;

whereby said inner ring and said outer ring with said end portions supported therebetween make up a single rigid vibration-resistant unit permitting displacement of said end portions in an axial direction relative to said stator core during operation of an electric machine.

2. An arrangement for supporting end windings in accordance with claim 1, further comprising gaskets made from moulding and hardening material, and disposed on said heads of said end portions between said inner and said outer rings; and pins attaching said inner and outer rings.

3. An arrangement for supporting end windings in accordance with claim 2, further comprising pins attaching said projection of each of said Z-shaped members, facing the end surface of said core, to a second end of one of said brackets.

4. An arrangement for supporting end windings in accordance with claim 3, wherein said pins are made of non-magnetic material.

5. An arrangement for supporting end windings in accordance with claim 4, wherein said pins are made of non-magnetic steel and have an electrically insulating coating.

6. An arrangement for supporting end windings in accordance with claim 4, wherein said pins are made of fiberglass material.

* * * * *